Dec. 27, 1960
A. B. FREDHOLD, JR
2,966,200
SHOCK ABSORBENT FITTING
Filed Sept. 4, 1959
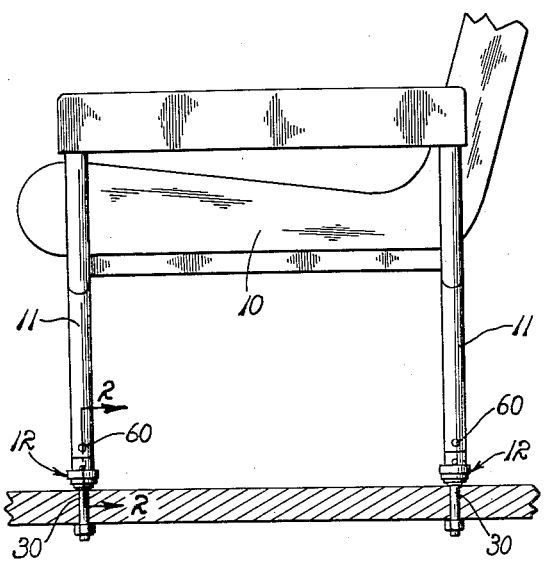
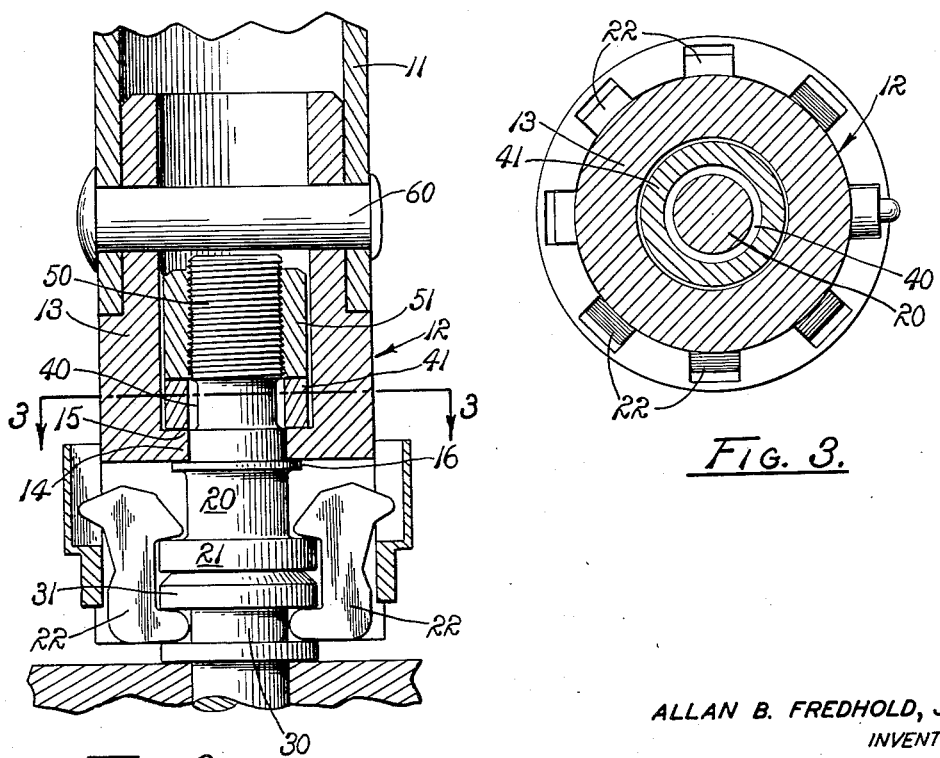
ALLAN B. FREDHOLD, JR.
INVENTOR
HUEBNER & WORREL
ATTORNEYS
BY

United States Patent Office 2,966,200
Patented Dec. 27, 1960

2,966,200

SHOCK ABSORBENT FITTING

Allan B. Fredhold, Jr., Burbank, Calif., assignor to Aeroquip Corporation, Jackson, Mich., a corporation of Michigan Filed Sept. 4, 1959, Ser. No. 838,259

1 Claim. (Cl. 155—9)

This invention relates to a fitting used with a fastener, said fitting being shock absorbent to receive and absorb inertial forces and prevent them from acting upon the fastener. Said fitting is particularly adaptable for use in connection with a fastener for aircraft seats, but is equally usable with any object which may be subject to sudden great inertial forces.

Aircraft seats are generally fastened to the floor of the cabin of an airplane by mounting a rigid fastener on each leg of the seat and attaching each fastener to a stud rigidly mounted on the floor. The seat is thus held in firm position on the floor, but is usually removable for cleaning or repair.

In the event of a crash, the said seat fasteners are subject to great inertial forces at the moment of impact, particularly when a passenger is seated in and strapped to the seat, and extraordinarily severe strains are placed on the fasteners, frequently causing either the fasteners themselves, or the floor studs on which they are mounted, to shear. Investigation of some recent crashes have shown fatally injured passengers, still strapped to their seats, but with the seats torn loose from the floor of the cabin and piled up against the forward bulkhead of the cabin.

Various shock absorbing devices, such as springs, have been used or proposed to correct this condition and relieve the fasteners and studs from these inertial loads, but their shock absorbent qualities have been limited.

The fitting of the present invention is intended to be used to substantially absorb such great forces and prevent their impact on the fasteners or floor studs, so that even in severe crashes the aircraft seats will remain firmly fastened to the floor of the cabin, with a great increase in the safety factor for the occupants of the cabin.

It is an object of this invention to provide a shock absorbent fitting with a low elastic limit which may be readily installed with a fastener, such as an aircraft seat fastener, to absorb great inertia load and prevent it from acting on said fastener or the stud on which said fastener is mounted.

It is another object of the invention to provide a shock absorbent fitting which may be easily installed or replaced.

It is a further object of the invention to provide a shock absorbent fitting which is simple in design and construction and economical to produce.

With these and other objects in view, the invention consists of the construction, arrangement and combination of the various parts of the device whereby the objects contemplated are attained, as hereinafter set forth, pointed out in the appended claim, and illustrated in the accompanying drawings.

In the drawings:

Figure 1 is a side elevational view of an aircraft seat affixed to the floor of the cabin of an airplane by means of leg fasteners mounted on floor studs.

Figure 2 is an enlarged vertical cross-sectional view taken on the line 2—2 of Figure 1.

Figure 3 is a horizontal cross-sectional view taken on the line 3—3 of Figure 2, but with a detent mechanism, not material to the invention, shown.

An aircraft seat 10 has hollow tubular legs 11, at the lower extremity of each of which is mounted a fastener 12.

Said fastener may be of the dog construction type shown in some detail in Figure 2, having a hollow tubular body portion 13 and a body stud 20 inserted in said hollow tubular body portion 13. Body stud 20 is held by means of a flanged head 21 and dogs 22 to a floor stud 30, also having a flanged head 31.

Fastener body stud 20 has formed therein a recessed annular groove 40, and mounted externally of said groove 40 is a shock absorbent fitting 41, constructed of a shock absorbent material such as lead, brass, copper, aluminum, zinc, or other metallic or non-metallic material having a relatively low compressive strength and a relatively low elastic limit.

Body portion 13 of fastener 12 has formed thereon an internally extending annular flange 14, forming an annular shoulder 15 on which fitting 41 is seated. Flange 14 in turn is seated on externally projecting flange 16, which is formed on body stud 20.

Body stud 20 has a screw thread 50 at the upper end thereof, on which is mounted a nut 51 which firmly seats on fitting 41 and holds it in position externally of groove 40 and firmly seated on shoulder 15.

Fastener 12, with fitting 41 mounted thereon as hereinabove described, is inserted in a hollow tubular leg 11 and held in place by any suitable means, such as by bolt 60.

In the event of a crash, inertial forces on seat 10 will pass down each of legs 11 and be absorbed by fitting 41, which will be warped and distorted so as to flow into and occupy all or a substantial part of recessed groove 40, but said inertial forces will not be returned from said fitting to be applied to said fastener 12 or floor stud 30.

Subsequently the seat 10 may be removed from fastener 12, and distorted fitting 41 may be removed and replaced for subsequent installation of the same fastener 12.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claim so as to embrace any and all equivalent structures and devices.

I claim:

A shock absorbent fitting for use in combination with an aircraft seat floor fastener which comprises: an aircraft seat having a hollow tubular leg; a hollow tubular fastener mounted internally in said leg; a stud mounted internally in said fastener; an annular groove formed on said stud; an internally projecting annular shoulder on said fastener adjacent to and below said groove; a nut adjustably threaded on said stud adjacent to and above said groove; and an annular ring of a material of relatively low compressive strength and of relatively low elastic limit, firmly seated between said shoulder and said nut, externally of said groove, so as to flow into said groove upon application of substantial inertial forces to said ring.

References Cited in the file of this patent

UNITED STATES PATENTS

| | | |
|---|---|---|
| 994,892 | Tschudy | June 13, 1911 |
| 2,227,717 | Jones | Jan. 7, 1941 |
| 2,639,913 | Reynolds | May 26, 1953 |
| 2,666,409 | Kane | Jan. 19, 1954 |
| 2,772,903 | Sussenbach | Dec. 4, 1956 |